(12) United States Patent
Jenney

(10) Patent No.: US 12,110,995 B2
(45) Date of Patent: Oct. 8, 2024

(54) SYSTEMS AND METHODS FOR CLAMP ASSEMBLIES

(71) Applicant: Life Technologies Corporation, Carlsbad, CA (US)

(72) Inventor: Gary Jenney, Newport, PA (US)

(73) Assignee: Life Technologies Corporation, Carlsbad, CA (US)

( * ) Notice: Subject to any disclaimer, the term of this patent is extended or adjusted under 35 U.S.C. 154(b) by 209 days.

(21) Appl. No.: 17/635,548

(22) PCT Filed: Aug. 25, 2020

(86) PCT No.: PCT/US2020/047827
§ 371 (c)(1),
(2) Date: Feb. 15, 2022

(87) PCT Pub. No.: WO2021/050264
PCT Pub. Date: Mar. 18, 2021

(65) Prior Publication Data
US 2022/0333721 A1    Oct. 20, 2022

Related U.S. Application Data

(60) Provisional application No. 62/898,050, filed on Sep. 10, 2019.

(51) Int. Cl.
*F16L 23/08* (2006.01)
*F16L 23/04* (2006.01)
*F16L 23/06* (2006.01)

(52) U.S. Cl.
CPC ............... *F16L 23/08* (2013.01); *F16L 23/04* (2013.01); *F16L 23/06* (2013.01)

(58) Field of Classification Search
CPC ......... F16L 17/04; F16L 21/065; F16L 23/08; F16L 23/04; F16L 23/06; F16L 23/10;
(Continued)

(56) References Cited

U.S. PATENT DOCUMENTS

2009/0091125 A1    4/2009    Takeda et al.
2016/0084420 A1    3/2016    Barrientos
(Continued)

FOREIGN PATENT DOCUMENTS

| EP | 1 693 609 A2 | 8/2006 |
| GB | 2 485 626 A | 5/2012 |
| GB | 2 549 564 A | 10/2017 |

OTHER PUBLICATIONS

International Search Report and Written Opinion dated Dec. 11, 2020, issued in PCT Application No. PCT/US2020/047827, filed Aug. 25, 2020.

*Primary Examiner* — Aaron M Dunwoody
(74) *Attorney, Agent, or Firm* — Mintz, Levin, Cohn, Ferris, Glovsky and Popeo, P.C

(57) ABSTRACT

A tube clamp for bioprocessing, comprising: a first clamp member (102) having a first end joined to a second end by a crescent shaped body comprising: an interior (118) having a groove (116) extending along the crescent shaped body and including a lower surface joined to a sidewall and a top surface joined to the sidewall by a tapered surface (124), wherein the tapered surface is angled at forty-five degrees relative to the lower surface and the top surface; an exterior surrounding the interior, the exterior including an exterior surface joined to an exterior sidewall by an exterior taper, the exterior taper is angled at forty-five degrees relative to the exterior surface and the exterior sidewall and the exterior sidewall is joined to the top surface; a closure region (112) joined to the first end; and an attachment region (110) joined to the second end; and a second clamp member having a first end joined to a second end by a crescent shaped body comprising: an interior including a groove extending along the crescent shaped body and including a lower surface joined to a sidewall and a top surface joined to the sidewall by a tapered surface (146), wherein the tapered surface is
(Continued)

angled at forty-five degrees relative to the lower surface and the top surface; an exterior surrounding the interior, the exterior including an exterior surface joined to an exterior sidewall by an exterior taper (154), the exterior taper is angled at forty-five degrees relative to the exterior surface and the exterior sidewall and the exterior sidewall is joined to the top surface; a closure region joined to the first end; and an attachment region (130) joined to the second end.

15 Claims, 15 Drawing Sheets

(58) Field of Classification Search
CPC . F16L 37/10; F16L 37/20; F16L 33/04; F16L 33/06; F16L 33/10; F16L 33/12; F16L 33/03; F16L 33/035
See application file for complete search history.

(56) References Cited

U.S. PATENT DOCUMENTS

2017/0059078 A1\* 3/2017 Ryan ................. F16L 21/06
2018/0187806 A1\* 7/2018 Thompson ............. F16L 23/10

\* cited by examiner

SYSTEMS AND METHODS FOR CLAMP ASSEMBLIES

BACKGROUND

The bioproduction industry requires complex fluid transfer systems that include a variety of ways to form connections between the various kinds of tubing and piping. Such systems and methods need to be leak proof and comply with industry regulations.

Commercially available connection systems include pivot and connection regions that can allow for overtightening of the clamp. Addition problems include a lack of ergonomic concern with regard to the closing features.

What is needed is a clamp design that is molded to prevent structural failures in piping or tubing by eliminating sharp edges and designing pivot and latching features that prevent over closing of the clamp and where actuation of the clamp position is made easy by an ergonomic design.

BRIEF SUMMARY

In one aspect, a tube clamp for bioprocessing is disclosed. The tube clamp may include a first clamp member having a first end joined to a second end by a crescent shaped body including an interior having a groove extending along the crescent shaped body and including a lower surface joined to a sidewall and a top surface joined to the sidewall by a tapered surface, wherein the tapered surface is angled at forty-five degrees relative to the lower surface and the top surface, an exterior surrounding the interior, the exterior including an exterior surface joined to an exterior sidewall by an exterior taper, the exterior taper is angled at forty-five degrees relative to the exterior surface and the exterior sidewall and the exterior sidewall is joined to the top surface, a closure region joined to the first end, and an attachment region joined to the second end, and a second clamp member having a first end joined to a second end by a crescent shaped body including an interior including a groove extending along the crescent shaped body and including a lower surface joined to a sidewall and a top surface joined to the sidewall by a tapered surface, wherein the tapered surface is angled at forty-five degrees relative to the lower surface and the top surface, an exterior surrounding the interior, the exterior including an exterior surface joined to an exterior sidewall by an exterior taper, the exterior taper is angled at forty-five degrees relative to the exterior surface and the exterior sidewall and the exterior sidewall is joined to the top surface, a closure region joined to the first end, and an attachment region joined to the second end.

In some embodiments, the closure region of the first clamp member may include two equally spaced apart prongs and each prong has a first end and a second end, wherein the first ends are joined to the crescent shaped body and the second ends extend outwardly to create an opening.

In some embodiments, each prong may include a plurality of protrusions projecting off of an engagement surface.

In some embodiments, the closure region of the second clamp member may include two equally spaced apart prongs and each prong has a first end and a second end, wherein the first ends are joined to the crescent shaped body and the second ends extend outwardly to create an opening and a cross member joins the second ends to enclose the opening.

In some embodiments, the first and second clamp members may move relative to one another to form an open configuration and a closed configuration and in the closed configuration the engagement surface of the first clamp member comes into physical contact with an engagement surface of the second clamp member.

In some embodiments, the tube clamp for bioprocessing may further include a screw having a first end and a second end, wherein the first end includes threads and at least one flat surface and the second end includes a head having a taper.

In some embodiments, the opening of the second clamp member may include a wide region that tapers to a narrow region and the narrow region includes at least one flat surface.

In some embodiments, the first end of the screw may project through the narrow region, the two flat surfaces are in physical contact to restrict horizontal movement and the taper of the head extends through the wide region and abuts the narrow region and cross member to restrict lateral movement of the screw.

In some embodiments, the tube clamp for bioprocessing may further include a screw receiver having a first end and a second end, including a barrel surrounding an interior disposed on the second end of the screw receiver.

In some embodiments, an opening on the second end may accept the screw and a set of complimentary grooves within the interior engages the threads of the screw to secure the first and second clamp members into the closed configuration, and a handle disposed on the first end of the screw receiver and joined to the barrel.

In some embodiments, the handle may further include an uneven surface for gripping and the uneven surface includes a plurality of elongated channels.

In some embodiments, the tube clamp for bioprocessing may include a disk having a plurality of openings extends laterally away from the barrel.

In some embodiments, the tube clamp for bioprocessing may include a securing member in physical contact with at least one of the plurality of openings on the disk and the cross member of the second clamp member.

In some embodiments, the securing member may be a cable tie positioned to maintain the first and second clamp members in a closed position by drawing the at least one of the plurality of openings toward the cross member.

In some embodiments, the opening on the first clamp member may include a wide region and a narrow region that are joined by a shelf and the diameter of the barrel fits into the wide region and abuts the shelf in the closed configuration.

In some embodiments, the attachment region of the first clamp member may include a base surrounding an opening and the attachment region of the second clamp member includes a base having a projection extending therefrom, wherein the projection extends into the opening to allow the first and second clamp members move from an open configuration to a closed configuration.

In some embodiments, the closure region on the first clamp member may include a projection having a concave surface and the closure region on the second clamp member includes a projection and a bar cavity, a first latch member including a body having a first end and a second end, the first latch member including a bar joined to the second end to engage the bar cavity, a convex surface joined to the first end to engage the concave surface, a projection opening to accept the projection on the first clamp member, and two projections extending outwardly from the body, a second latch member including a body having a first end and a second end, the second latch member including two hooks surrounding two openings for engaging the protrusions on the first latch member, wherein actuating the first end of the second latch member causes the hooks to rotate about the protrusions.

In some embodiments, the closure region of the first clamp member may include an abutment joined to a hook by a surface and a barb extends from the hook toward the abutment.

In some embodiments, the closure region of the second clamp member may include an abutting surface and a barb receiver that is joined to a hook protrusion.

In some embodiments, the abutment may press against the abutting surface, the hook engages the hook protrusion, and the barb receiver interlocks with the barb to maintain the closed configuration.

In some embodiments, the attachment region of the first clamp member may include an abutting surface and a barb receiver that is joined to a hook protrusion, and wherein the attachment region of the second clamp member includes an abutment joined to a hook by a surface and a barb extends from the hook toward the abutment.

In some embodiments, the abutment may press against the abutting surface, the hook engages the hook protrusion, and the barb receiver interlocks with the barb to maintain the closed configuration.

In one aspect, a tube clamp for bioprocessing is disclosed. The tube clamp may include a first clamp member, comprising a first end joined to a second end by a crescent shaped body, and a closure region joined at the first end, a second clamp member, comprising, a first end joined to a second end by a crescent shaped body, and a closure region joined at the first end, wherein the closure region of the first clamp includes an abutment joined to a hook by a surface, wherein the closure region of the second clamp member includes an abutting surface joined to a hook protrusion, wherein the abutment presses against the abutting surface and the hook engages the hook protrusion.

In some embodiments, the first clamp member and the second clamp member each further comprise an attachment region located at the second ends, wherein the attachment region of the first clamp member includes an abutting surface joined to a hook protrusion.

In some embodiments, the attachment region of the second clamp member may include an abutment joined to a hook by a surface, and wherein the abutments press against the abutting surfaces and the hooks engage the hook protrusions.

In some embodiments, each of the hooks are joined to a barb and each of the hook protrusions are joined to a barb receiver, wherein the barb receiver interlocks with the barb to maintain the closed configuration.

In one aspect, a tube clamp for bioprocessing is disclosed. The tube clamp may include a first clamp member, comprising a first end joined to a second end by a crescent shaped body, and a closure region joined to the first end, a second clamp member comprising a first end joined to a second end by a crescent shaped body, and a closure region joined to the first end, wherein the closure region on the first clamp member includes a projection having a concave surface and the closure region on the second clamp member includes a projection and a bar cavity, a first latch member including a body having a first end and a second end, the first latch member including a bar joined to the second end to engage the bar cavity, a convex surface joined to the first end to engage the concave surface, a projection opening to accept the projection on the first clamp member, and two projections extending outwardly from the body, a second latch member including a body having a first end and a second end, the second latch member including two hooks surrounding two openings for engaging the protrusions on the first latch member, wherein actuating the first end of the second latch member causes the hooks to rotate about the protrusions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
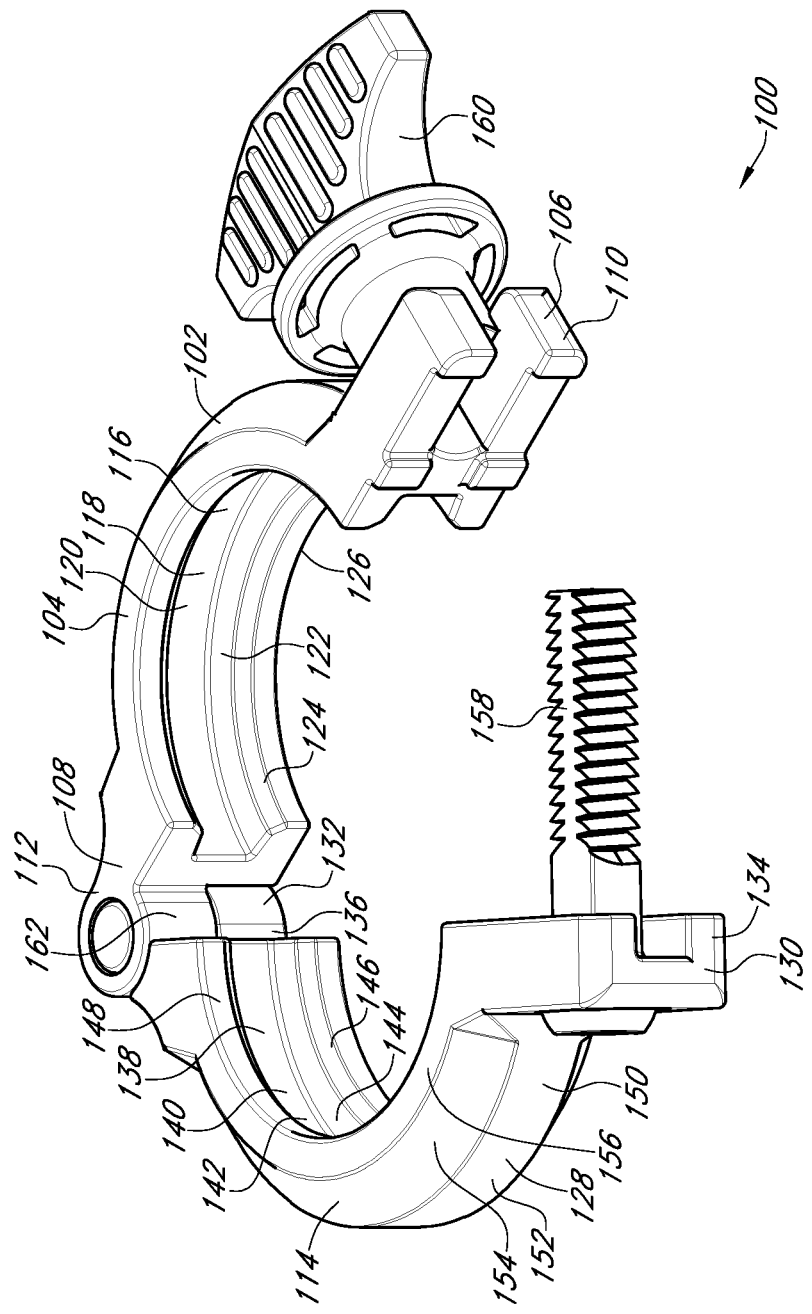
FIG. 1 illustrates a clamp 100 in an open configuration in accordance with one embodiment.

Embodiments of systems, methods, and apparatuses for tube clamps and sanitary connections are described in the accompanying description and figures. In the figures, numerous specific details are set forth to provide a thorough understanding of certain embodiments. A skilled artisan will be able to appreciate that the systems and methods described herein may be used for a variety of applications. Additionally, the skilled artisan will appreciate that certain embodiments may be practiced without these specific details. Furthermore, one skilled in the art will readily appreciate that the specific sequences in which methods are presented and performed are illustrative and it is contemplated that the sequences may be varied and still remain within the spirit and scope of certain embodiments.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Furthermore, in the described various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art will readily appreciate that the sequence may be varied and still remain within the spirit and scope of the various embodiments.

While preferred embodiments have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the apparatuses, systems, and methods described herein may be employed.

The terms "join" and "joined" are used throughout this document. The term "join" and all its variants shall mean any way that two or more objects can be attached to one other. In some cases, this may be through weld, adhesive, screw, pin, or joint. In some cases, this may occur by two parts being molded as one through injection molding, three-dimensional printing, or machining.

FIGS. 1-6 illustrate clamp 100 systems and methods according to various embodiments. The clamp 100 comprises a first clamp member 102 pivotally joined to a second clamp member 114.

In various embodiments, a first and second clamp member 102, 114 may each include a first end 106, 130 joined to a second end 108, 132 by a crescent shaped body 104, 128. In some embodiments, the ends 106, 108, 130, 132 may be joined to the bodies 104, 128 by adhesive, weld, or any other known joining method. In some embodiments, the ends 106, 108, 130, 132 may be joined to the bodies 104, 128 by being comprised of one solid part. Examples of how to achieve this may be through injection molding, three-dimensional printing, or some other known machining method. The first and second clamp members 102, 114 may include polymer or metal.

In various embodiments, the crescent shaped bodies 104, 128 each may include an interior 118, 142 having a groove 116, 138 extending along the length of the crescent shaped body 104, 128. The groove 116, 138 may include a lower surface 120, 140 joined to a sidewall 122, 144 and a top surface 126, 148 joined to the sidewall 122, 144 by a tapered surface 124, 146. In some embodiments, the tapered surface 124, 146 may be angled at forty-five degrees relative to the lower surface 120, 140 and the top surface 126, 148. Such a configuration may be useful in preventing damage to tubing or piping caused by sharp edges. Elimination of sharp edges also may save on material costs by reducing the overall amount of material required to produce the crescent shaped body 104, 128.

In various embodiments, the crescent shaped bodies 104, 128 may include an exterior 202, 150 surrounding the interior 118, 142. The exterior 202, 150 may include an exterior surface 204, 152 joined to an exterior sidewall 208, 156 by an exterior taper 154, 206. In some embodiments, the exterior taper 206, 154 may be angled at forty-five degrees relative to the exterior surface 204, 152 and the exterior sidewall 208, 156 and the exterior sidewall 208, 156 may be joined to the top surface 126, 148.

In various embodiments, the first clamp member 102 may include a closure region 110 joined to the first end 106. In various embodiments, the closure region 110 may include two equally spaced apart prongs 502 and each prong 502 may include a first end 504 and a second end 506. In some embodiments, the first ends 504 may be joined to the crescent shaped body 104 and the second ends 506 may extend outwardly to create an opening 508. In some embodiments, each prong 502 may include a plurality of protrusion 514 projecting off of an engagement surface 512.

Figure 2:
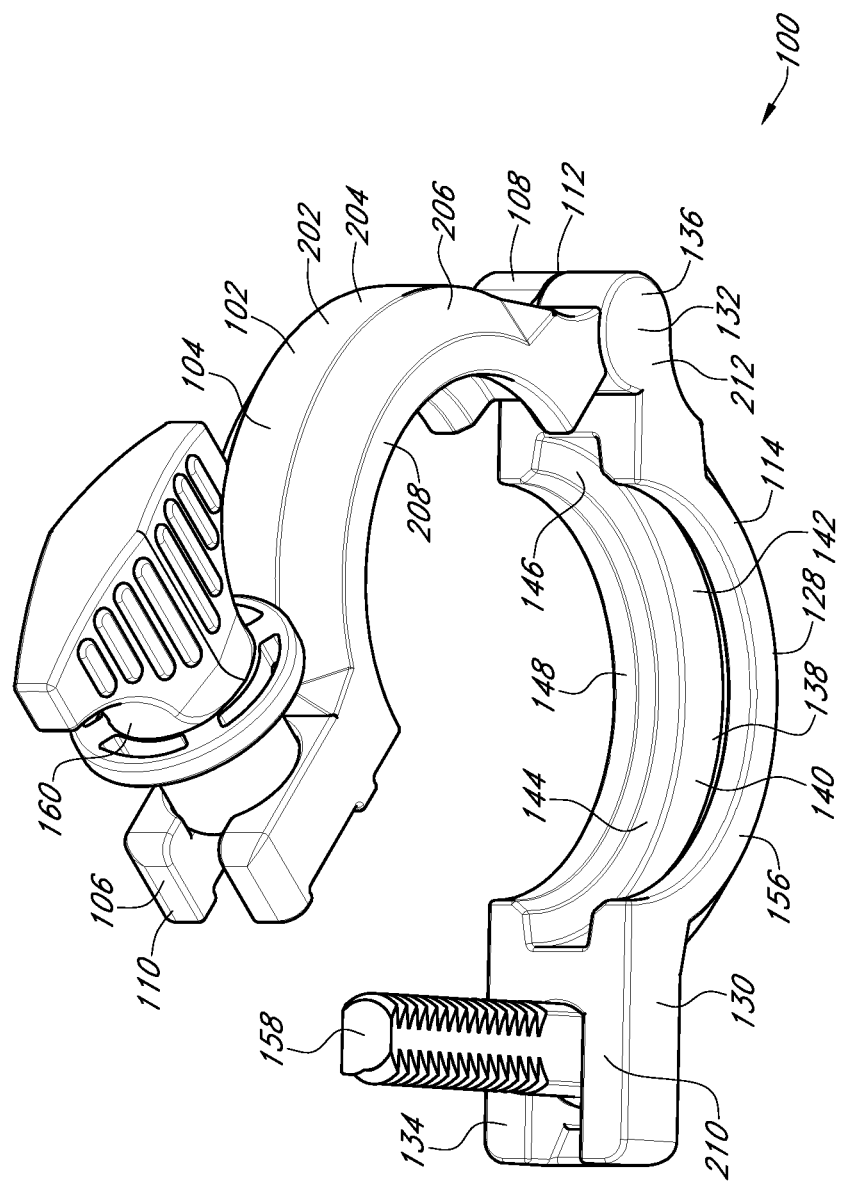
FIG. 2 illustrates a clamp 100 in an open configuration in accordance with one embodiment.
Figure 3:
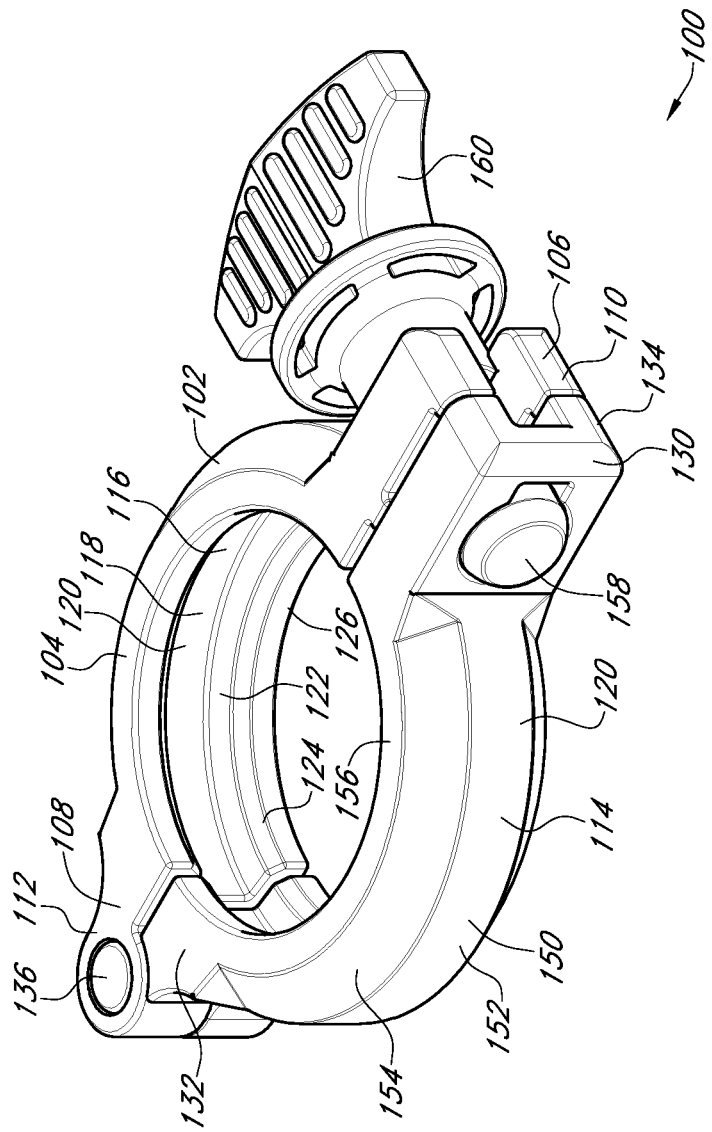
FIG. 3 illustrates a clamp 100 in a closed configuration in accordance with one embodiment.
Figure 4:
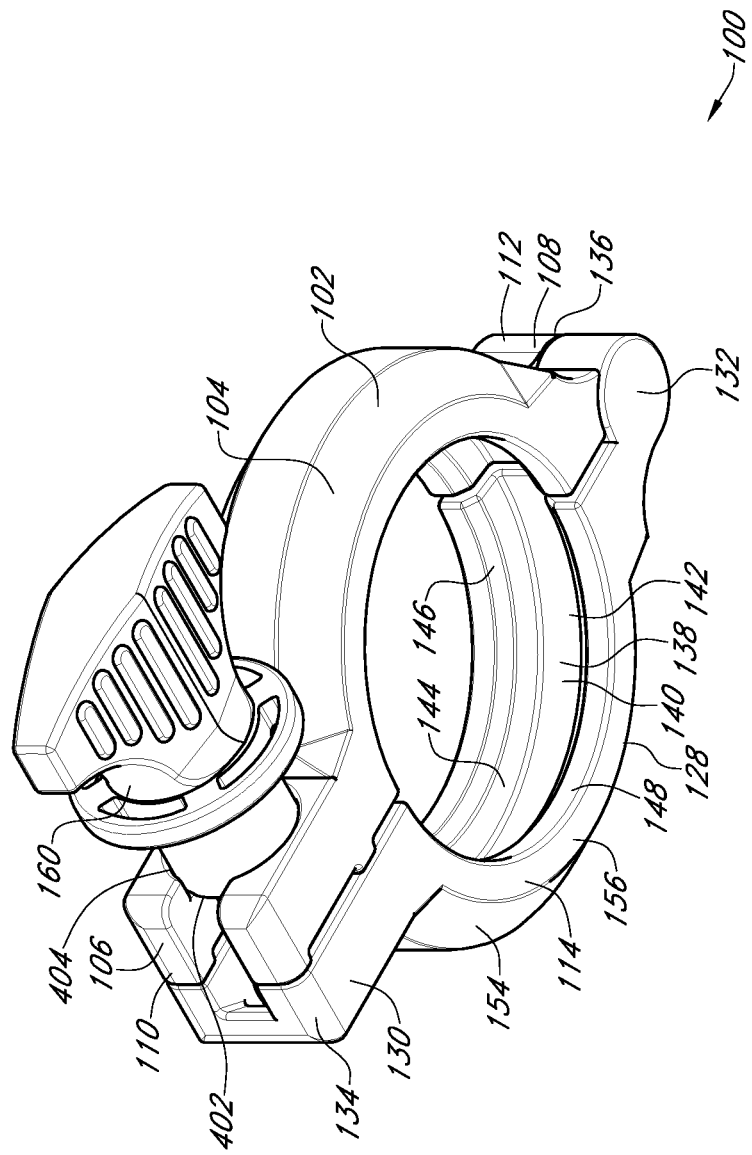
FIG. 4 illustrates a clamp 100 in a closed configuration in accordance with one embodiment.
Figure 5:
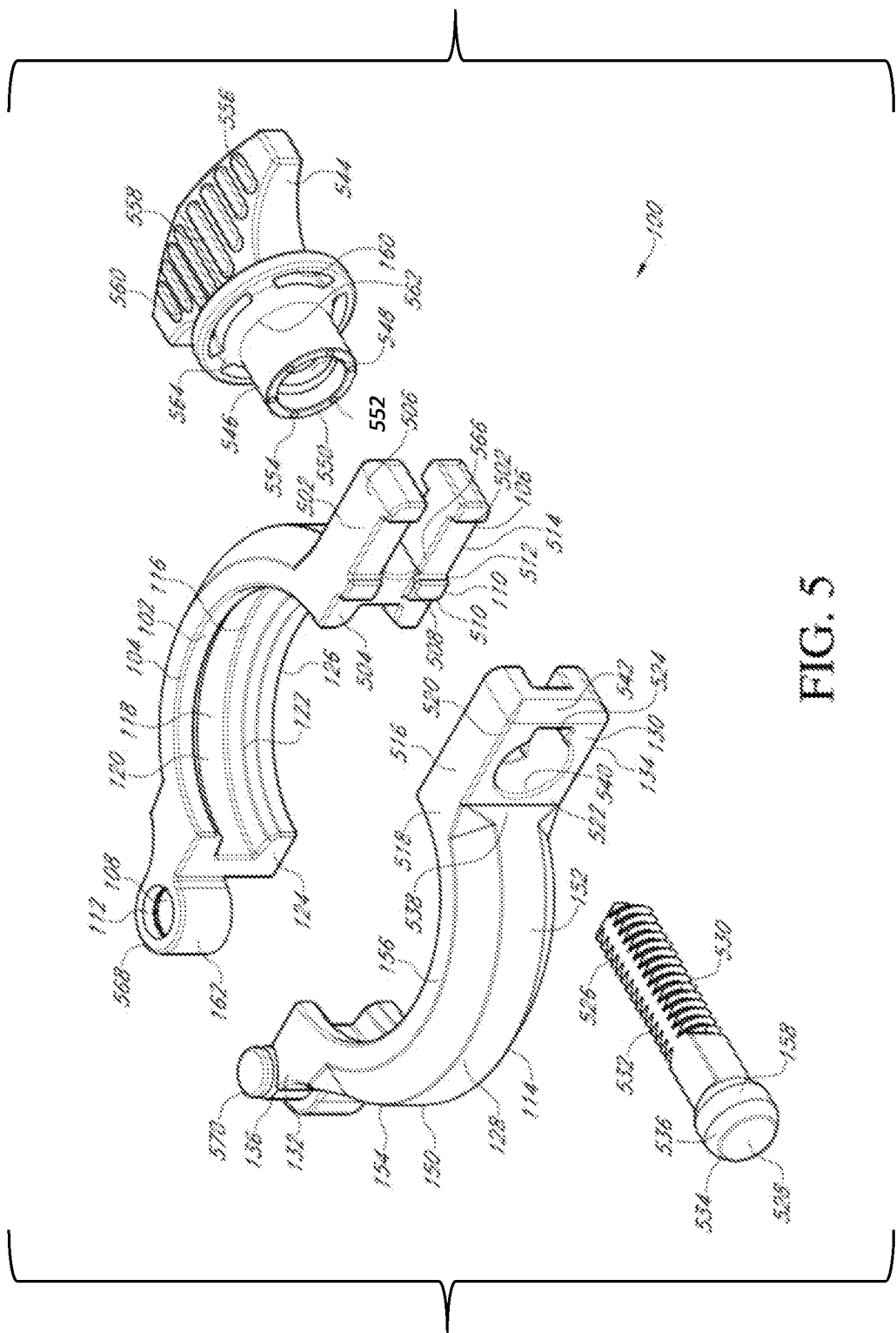
FIG. 5 illustrates an exploded view of clamp 100 in accordance with one embodiment.
Figure 6:
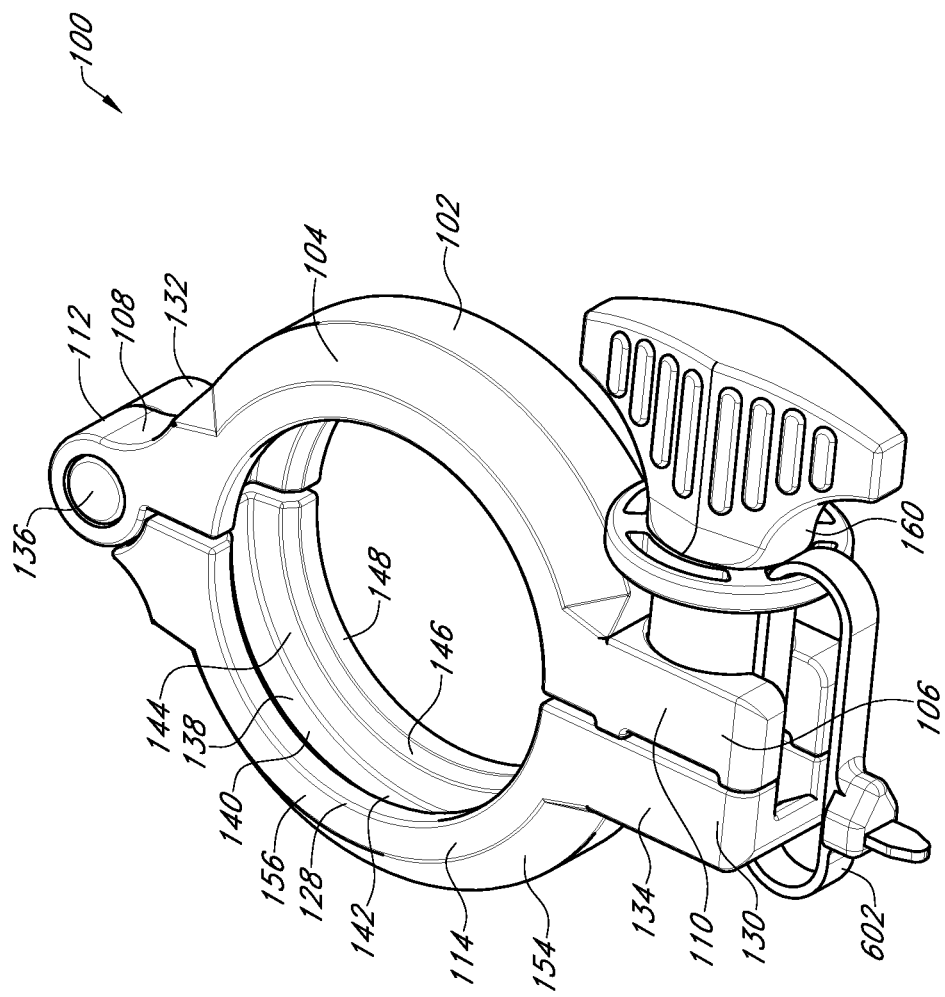
FIG. 6 illustrates a clamp 100 in a closed configuration with cable tie in accordance with one embodiment.
Figure 7:
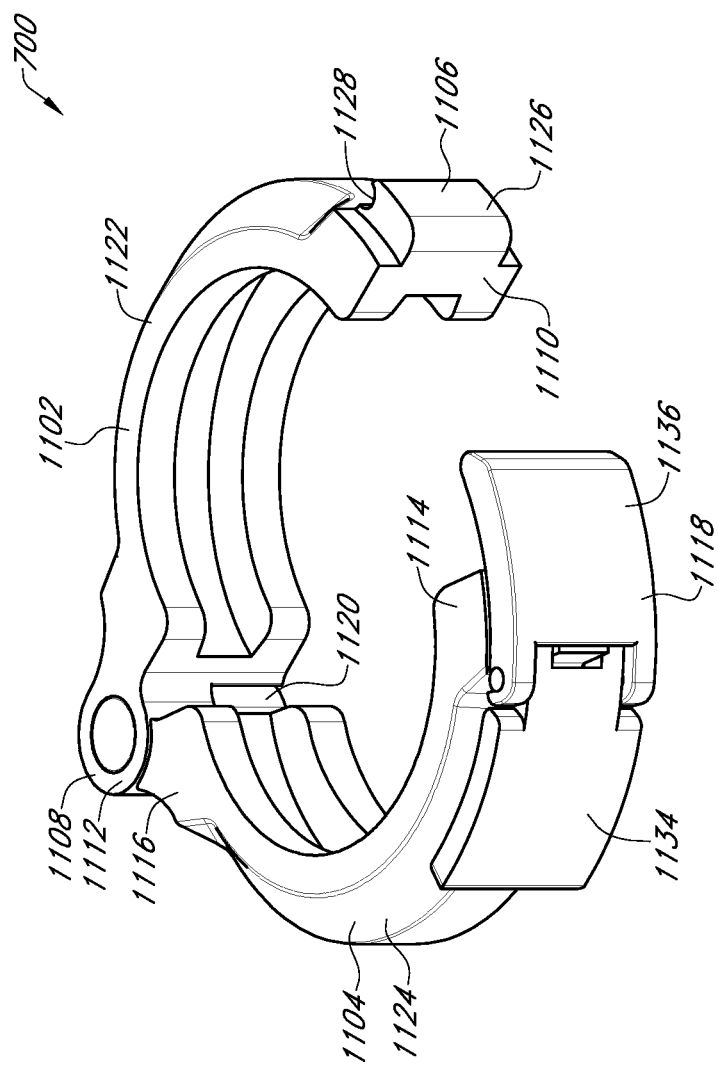
FIG. 7 illustrates a clamp 700 in an open configuration in accordance with one embodiment.
Figure 8:
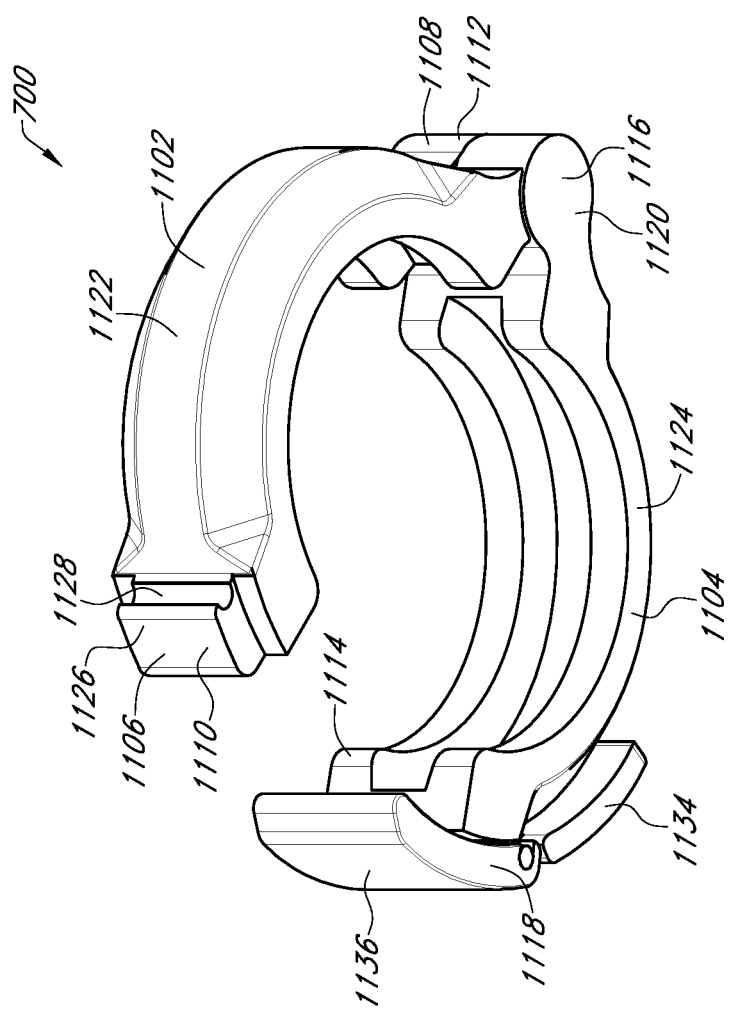
FIG. 8 illustrates a clamp 700 in an open configuration in accordance with one embodiment.
Figure 9:
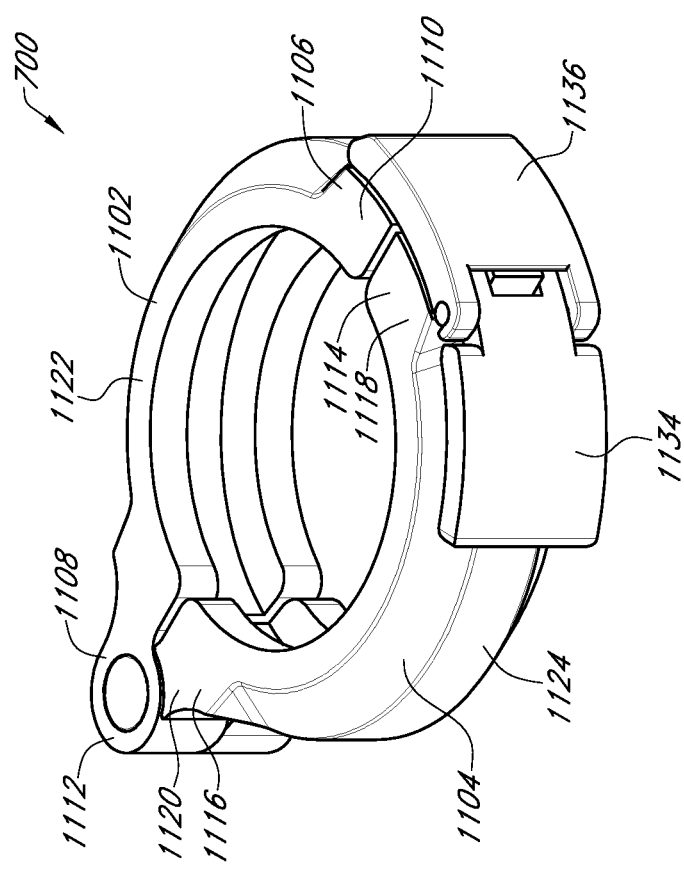
FIG. 9 illustrates a clamp 700 in a closed configuration in accordance with one embodiment.
Figure 10:
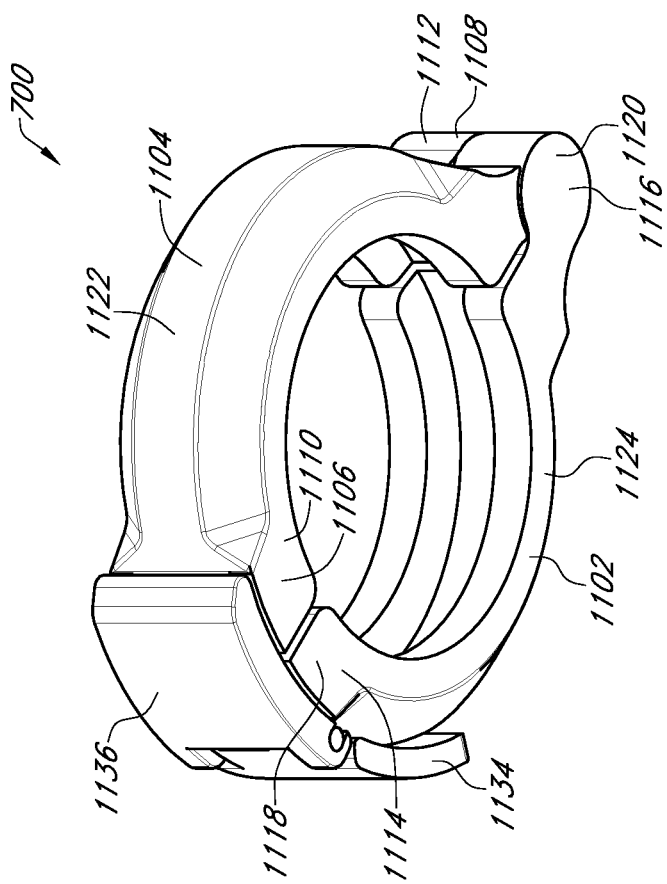
FIG. 10 illustrates a clamp 700 in a closed configuration in accordance with one embodiment.
Figure 11:
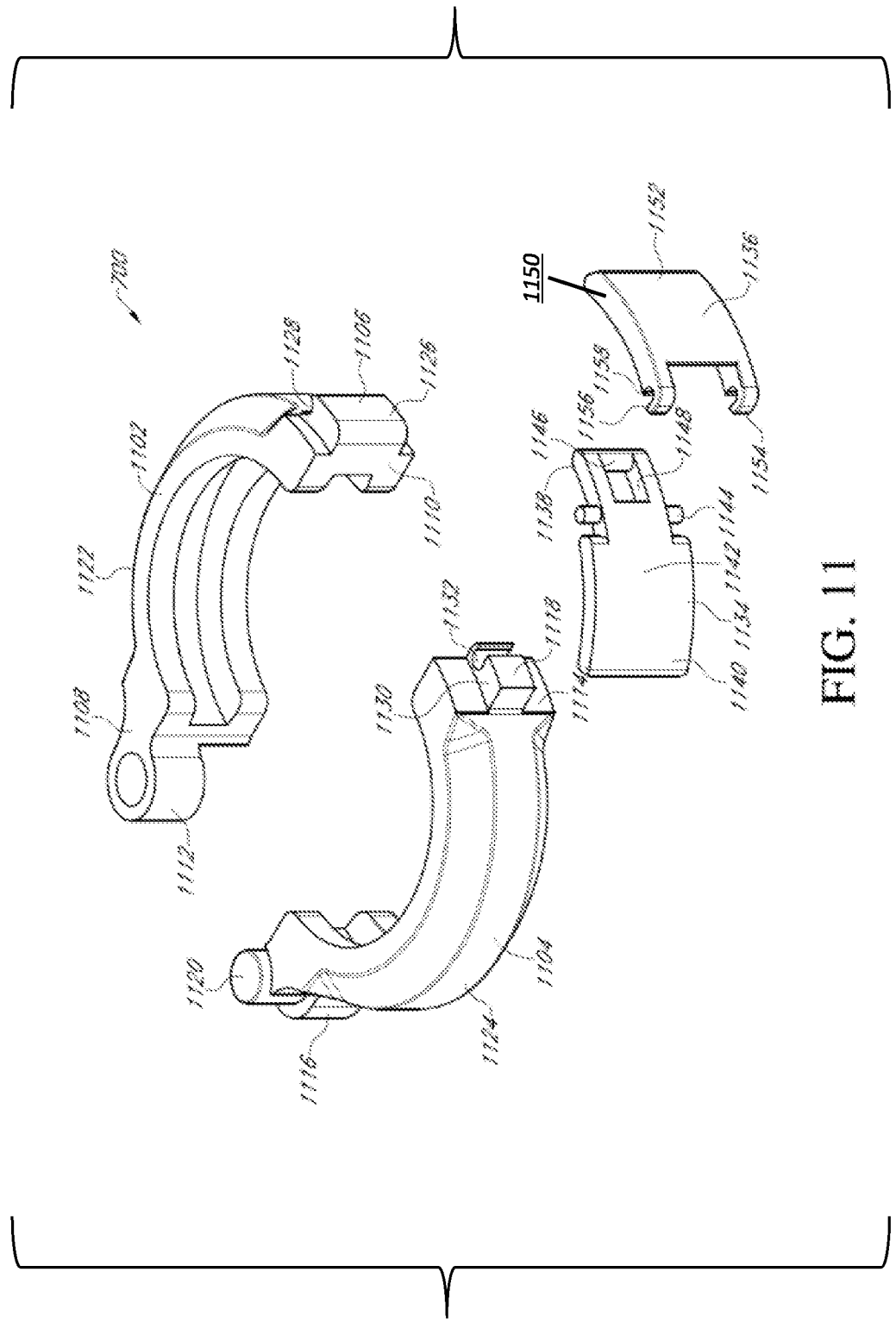
FIG. 11 illustrates an exploded view of a clamp 700 in accordance with one embodiment.
Figure 12:
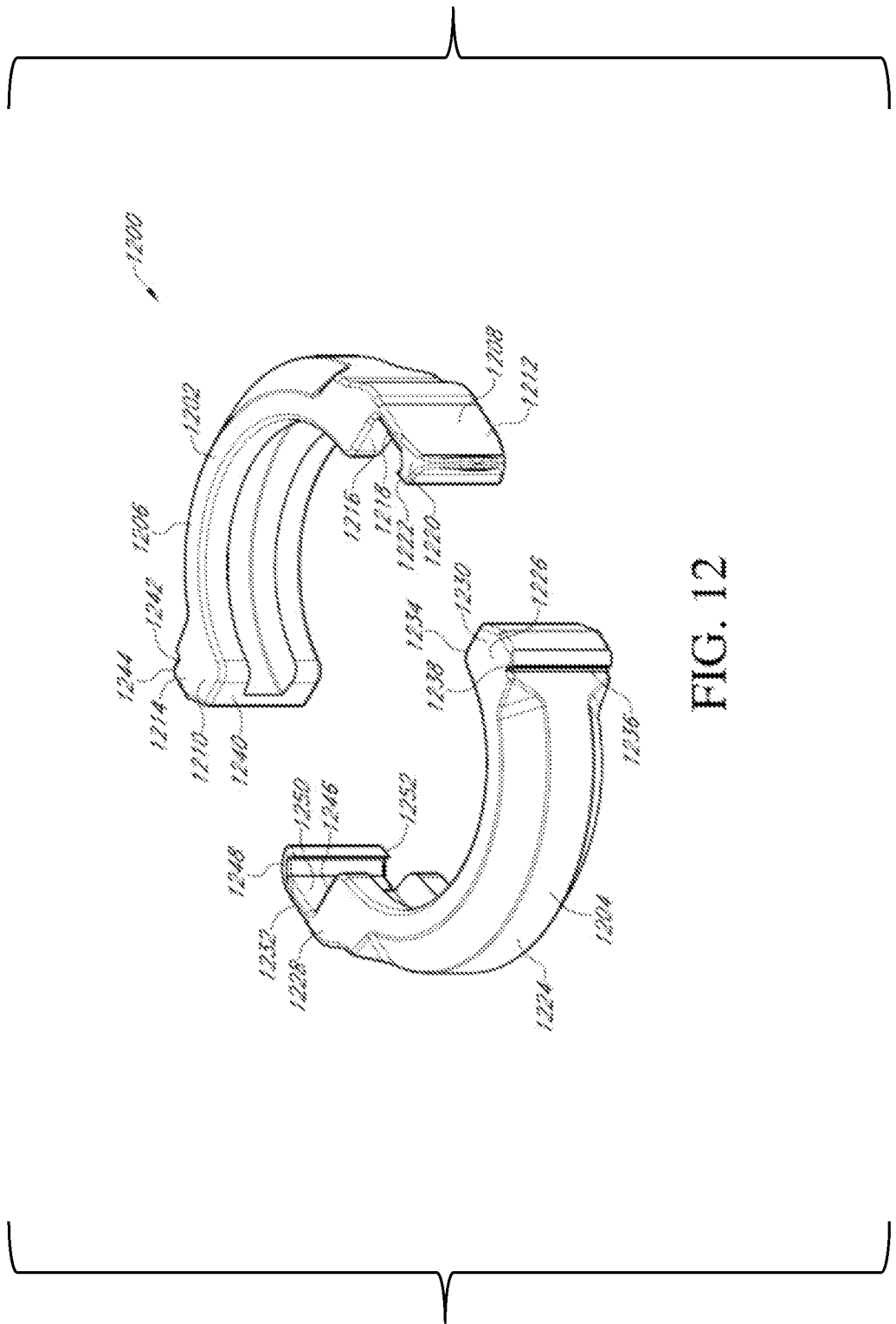
FIG. 12 illustrates a clamp 1200 in an open configuration in accordance with one embodiment.
Figure 13:
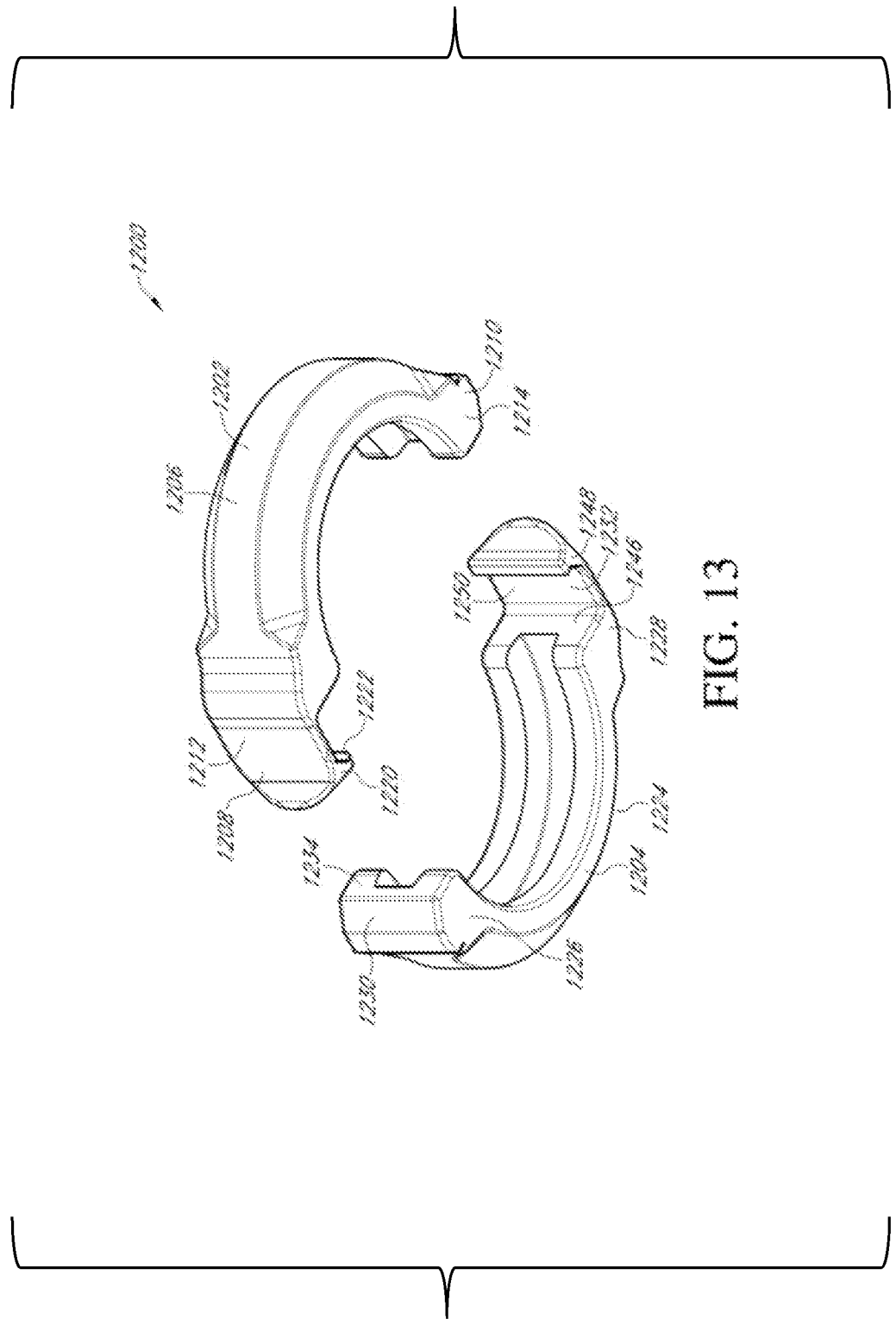
FIG. 13 illustrates a clamp 1200 in an open configuration in accordance with one embodiment.
Figure 14:
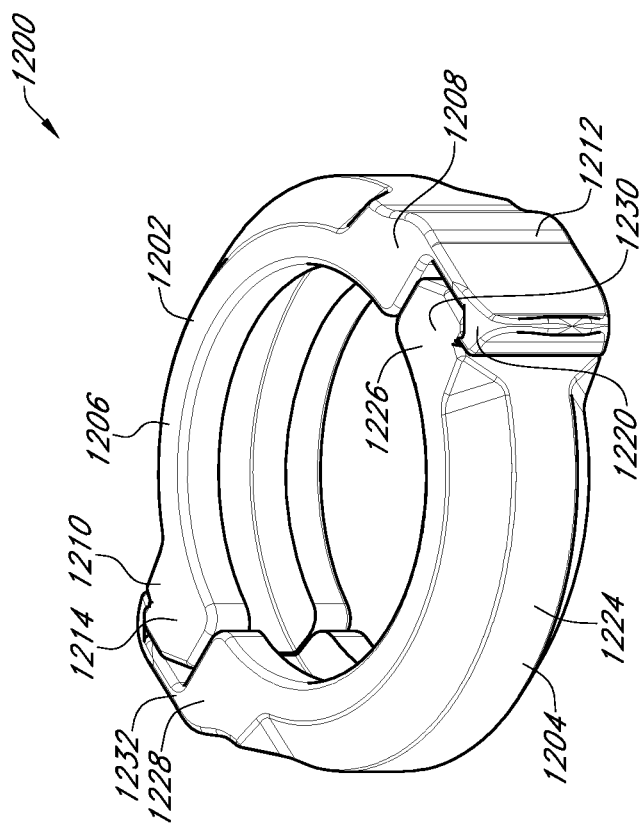
FIG. 14 illustrates a clamp 1200 in a closed configuration in accordance with one embodiment.
Figure 15:
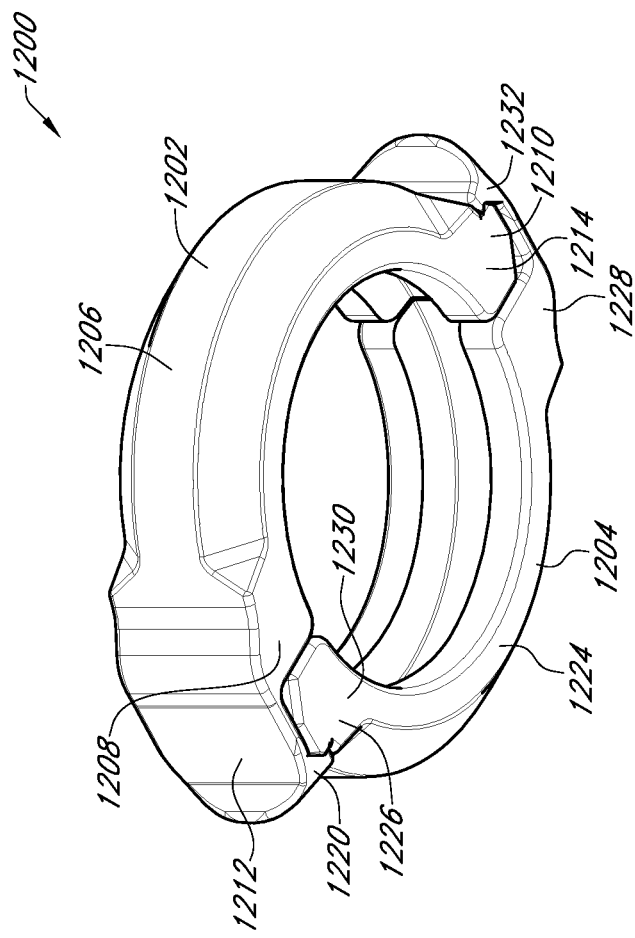
FIG. 15 illustrates a clamp 1200 in a closed configuration in accordance with one embodiment.

In various embodiments, the second clamp member 114 may include a closure region 134 joined to the first end 130. In various embodiments, the closure region 134 may include two equally spaced apart prongs 516 and each prong 516 may have a first end 518 and a second end 520. In some embodiments, the first ends 518 may be joined to the crescent shaped body 128 and the second ends 520 may extend outwardly to create an opening 522 and a cross member 524 may join the second ends 506, 520 to enclose the opening 522. In some embodiments, the first and second clamp members 102, 114 may move relative to one another to form an opening configuration, as depicted in FIGS. 1 and 2, and a closed configuration, as depicted in FIGS. 3 and 4. In some embodiments, the engagement surface 510 of the first clamp member 102 may come into physical contact with the engagement surface 512 of the second clamp member 114. In some embodiments, the engagement surfaces 510, 512 physically interact through the plurality of protrusions 514. In some embodiments, the protrusions 514 serve to prevent overtightening of the clamp 100.

In various embodiments, the clamp 100 may include a screw 158 and a screw receiver 160 or nut for securing the two closure 110, 134 to one another. In various embodiments, the screw 158 may have a first end 526 and a second end 528 wherein the first end 526 may include threads 530 and at least one flat surface 532 and the second end 528 may include a head 534 having a taper 536. In some embodiments, the opening 522 on the closure region 134 of the second clamp member 114 may include a wide region 538 that tapers to a narrow region 540 and the narrow region 540 may include at least one flat surface 542. In some embodiments, the screw 158 may project through the narrow region 540. In some embodiments, the two flat surfaces 532, 542 may be in physical contact to restrict horizontal movement. In some embodiments, the taper 536 of the head 534 may extend through the wide region 538 and abuts the narrow region 540 and cross member 524 to restrict lateral movement of the screw 158.

In various embodiments, the clamp 100 may include a screw receiver 160 or nut to interact with the threads 530 on the screw 158 to hold the two closures 110, 134 to one another. In various embodiments, the screw receiver 160 may include a first end 544 and a second end 546. In various embodiments, a barrel 548 may surround an interior 552 that may be disposed on the second end 546 of the screw receiver 160. In some embodiments, an opening 550 on the second end 546 or barrel 548 accepts the screw 158 and a set of complimentary grooves 554 within the interior 552 may engage the threads 530 of the screw 158 to secure the first and second clamp members 102, 114.

In various embodiments, a handle 556 may be disposed on the first end 544 of the screw receiver 160 and joined to the barrel 548. In some embodiments, the handle 556 may include an uneven surface 558 for gripping and the uneven surface 558 may include a plurality of elongated channels 560.

In various embodiments, a disk 562 having a plurality of opening 564 may extend laterally away from the barrel. In some embodiments, the disk 562 may be a single contiguous piece of material to that of the barrel 548. In some embodiments, the disk 562 may be joined using any known method. In some embodiments, a securing member 602 may be in physical contact with at least one of the plurality of openings 564 and the cross member 524 of the second clamp member 114. In some embodiments, the securing member 602 may be a cable tie positioned to maintain the first and second clamp members 102, 114 in a closed position by drawing the at least one of the plurality of openings 564 toward the cross member 524. In some embodiments, the cable tie can wrap around the cross member 524 and be threaded through the opening 564. In some embodiments, the opening 508 in the first clamp member 102 may include a wide region 538 and a narrow region 566 that are joined by a shelf 402 and the diameter of the barrel 548 may fit into the wide region 538 and abut the shelf 402 in the closed configuration. In some embodiments, a user may screw the screw receiver 160 onto the threads 530 of the screw 158 until resistance is met by the barrel 548 pressing into the shelf 402.

In various embodiments, the tube clamp 100 may include an attachment region 112 joined to the second end 108 of the first clamp member 102. In various embodiments, the attachment region 112 may include a base 162 surrounding an opening 568 and the attachment region 136 of the second clamp member 114 may include a base 212 having a projection 570 extending therefrom. In some embodiments the projection 570 may extend into the opening 568 to allow the first and second clamp members 102, 114 to move from an open configuration to a closed configuration. In some embodiments, the hardware on the second ends 108, 132 can be reversed to create a hinge joint. A skilled artisan will realize that there are many ways to create a joint or interface that allows two objects to stay in proximity while moving relative to one another. One of the advantages of the kind of joint used in FIGS. 1-6 is that the clamp members 102, 114 move along single plane which makes positioning the device over a tube easier.

FIGS. 7-11 illustrate clamp 700 systems and methods according to various embodiments. In various embodiments, the clamp 700 may include a first clamp member 1102 pivotally attached to a second clamp member 1104. In various embodiments, each clamp member 1102, 1104 may include a first end 1106, 1114 joined to a second end 1108, 1116 by a crescent shaped body 1122, 1124. In various embodiments, the second ends 1108, 1116 each include an attachment region 1112, 1120 that is similar in structure and function to what is illustrated in FIGS. 1-6.

In various embodiments, the closure region 1110 on the first clamp member 1102 may include a projection 1126 having a concave surface 1128 and the closure region 1118 on the second clamp member 1104 may include a projection 1130 and a bar cavity 1132.

In various embodiments, the clamp 700 may include a first latch member 1134 including a body 1142 having a first end 1138 and a second end 1140. In some embodiments, the first latch member 1134 may include a bar 1146 joined to the first end 1138 to engage the bar cavity 1132. In some embodiments, the first latch member 1134 may include a projection opening 1148 to accept the projection 1130 on the second clamp member 1104. In some embodiments, the first latch member 1134 may include two protrusions 1144 extending outwardly from the body 1142.

In various embodiments, the clamp 700 may include a second latch member 1136 including a first end 1152 and a second end 1154. In some embodiments, the second latch member 1136 may include two hooks 1156 surrounding two openings 1158 located near the second end 1154. In some embodiments, the hooks 1156 may engage the protrusions 1144 on the first latch member 1134. In some embodiments, the second latch member 1136 may include a convex surface 1150 joined to the first end 1152 to engage the concave surface 1128. In various embodiments, actuating the first end 1152 of the second latch member 1136 may cause the hooks 1156 to rotate about the protrusions 1144 on the first latch member 1134 and pull the first and second clamp members 1102, 1104 together into a closed configuration.

FIGS. 11-15 illustrate clamp 1200 systems and methods according to various embodiments. In various embodiments, the clamp 1200 may include a first clamp member 1202 attachable to a second clamp member 1204. In various embodiments, each first clamp member 1202, 1204 may include a first end 1208 and a second end 1210 joined by a crescent shaped body 1206, 1224. In various embodiments, the first end 1208, 1226 may each include a closure region 1212, 1230. In various embodiments, the second ends 1210, 1228 may each include an attachment region. In some embodiments, the physical features of the clamp members 1202, 1204 may include features from previously discussed embodiments such as the various tapered surfaces to eliminate sharp edges.

In various embodiments, the closure region 1212 of the first clamp member 1202 may include an abutment 1216 joined to a hook 1220 by a surface 1218 and a barb 1222 may extend from the hook 1220 toward the abutment 1216. In various embodiments, the closure region 1230 of the second clamp member 1204 may include an abutting surface 1234 and a barb receiver 1238. In some embodiments, the closure region 1212 may include a hook protrusion 1236. In various embodiments, the abutment 1216 may press against the abutting surface 1234, the hook 1220 may engage the hook protrusion 1236, and the barb receiver 1238 may interlock with the barb 1222 to maintain a closed configuration.

In various embodiments, the attachment region 1214 of the first clamp member 1202 may include an abutting surface 1240 and a barb receiver 1242 that is joined to a hook protrusion 1244. In various embodiments, the attachment region 1232 of the second clamp member 1204 may include an abutment 1246 joined to a hook 1248 by a surface 1250 and a barb 1252 may extend from the hook toward the abutment 1246. In some embodiments, the abutment 1246 may press against the abutting surface 1240, the hook 1248 may engage the hook protrusion 1244, and the barb receiver 1238 may interlock with the barb to maintain a closed configuration.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art will readily appreciate that the sequences may be varied and still remain within the spirit and scope of the various embodiments.

What is claimed is:

1. A tube clamp for bioprocessing, comprising:
a first clamp member having a first end joined to a second end by a crescent shaped body comprising:
an interior having a groove extending along the crescent shaped body and including a lower surface joined to a sidewall and a top surface joined to the sidewall by a tapered surface, wherein the tapered surface is angled at forty-five degrees relative to the lower surface and the top surface;
an exterior surrounding the interior, the exterior including an exterior surface joined to an exterior sidewall by an exterior taper, the exterior taper is angled at forty-five degrees relative to the exterior surface and the exterior sidewall and the exterior sidewall is joined to the top surface;
a closure region joined to the first end; and
an attachment region joined to the second end; and
a second clamp member having a first end joined to a second end by a crescent shaped body comprising:
an interior including a groove extending along the crescent shaped body and including a lower surface joined to a sidewall and a top surface joined to the sidewall by a tapered surface, wherein the tapered surface is angled at forty-five degrees relative to the lower surface and the top surface;
an exterior surrounding the interior, the exterior including an exterior surface joined to an exterior sidewall by an exterior taper, the exterior taper is angled at forty-five degrees relative to the exterior surface and the exterior sidewall and the exterior sidewall is joined to the top surface;
a closure region joined to the first end; and
an attachment region joined to the second end.

2. The tube clamp for bioprocessing of claim 1, wherein the closure region of the first clamp member includes two equally spaced apart prongs and each prong has a first end and a second end,
wherein the first ends are joined to the crescent shaped body and the second ends extend outwardly to create an opening,
wherein each prong includes a plurality of protrusions projecting off of an engagement surface.

3. The tube clamp for bioprocessing of claim 2, wherein the closure region of the second clamp member includes two equally spaced apart prongs and each prong has a first end and a second end,
wherein the first ends are joined to the crescent shaped body and the second ends extend outwardly to create an opening and a cross member joins the second ends to enclose the opening,
wherein the first and second clamp members move relative to one another to form an open configuration and a closed configuration and in the closed configuration the engagement surface of the first clamp member comes into physical contact with an engagement surface of the second clamp member.

4. The tube clamp for bioprocessing of claim 3, further comprising:
a screw having a first end and a second end, wherein the first end includes threads and at least one flat surface and the second end includes a head having a taper;
wherein the opening of the second clamp member includes a wide region that tapers to a narrow region and the narrow region includes at least one flat surface;
wherein the first end of the screw projects through the narrow region, the two flat surfaces are in physical contact to restrict horizontal movement and the taper of the head extends through the wide region and abuts the narrow region and cross member to restrict lateral movement of the screw.

5. The tube clamp for bioprocessing of claim 4, further comprising a screw receiver having a first end and a second end, including:
a barrel surrounding an interior disposed on the second end of the screw receiver, wherein an opening on the second end accepts the screw and a set of complimentary grooves within the interior engages the threads of the screw to secure the first and second clamp members into the closed configuration; and
a handle disposed on the first end of the screw receiver and joined to the barrel.

6. The tube clamp for bioprocessing of claim 5, wherein the handle further includes an uneven surface for gripping and the uneven surface includes a plurality of elongated channels.

7. The tube clamp for bioprocessing of claim 5, wherein a disk having a plurality of openings extends laterally away from the barrel.

8. The tube clamp for bioprocessing of claim 7, further comprising a securing member in physical contact with at least one of the plurality of openings on the disk and the cross member of the second clamp member.

9. The tube clamp for bioprocessing of claim 8, wherein the securing member is a cable tie positioned to maintain the first and second clamp members in a closed position by drawing the at least one of the plurality of openings toward the cross member.

10. The tube clamp for bioprocessing of claim 5, wherein the opening on the first clamp member includes a wide region and a narrow region that are joined by a shelf and a diameter of the barrel fits into the wide region and abuts the shelf in the closed configuration.

11. The tube clamp for bioprocessing of claim 1, wherein the attachment region of the first clamp member includes a base surrounding an opening and the attachment region of the second clamp member includes a base having a projection extending therefrom, wherein the projection extends into the opening to allow the first and second clamp members move from an open configuration to a closed configuration.

12. The tube clamp for bioprocessing of claim 1, further comprising:
wherein the closure region on the first clamp member includes a projection having a concave surface and the closure region on the second clamp member includes a projection and a bar cavity;
a first latch member including a body having a first end and a second end, the first latch member including a bar joined to the second end to engage the bar cavity, a convex surface joined to the first end to engage the concave surface, a projection opening to accept the projection on the first clamp member, and two projections extending outwardly from the body;

a second latch member including a body having a first end and a second end, the second latch member including two hooks surrounding two openings for engaging the protrusions on the first latch member, wherein actuating the first end of the second latch member causes the hooks to rotate about the protrusions.

13. The tube clamp for bioprocessing of claim 1,
wherein the closure region of the first clamp member includes an abutment joined to a hook by a surface and a barb extends from the hook toward the abutment, and
wherein the closure region of the second clamp member includes an abutting surface and a barb receiver that is joined to a hook protrusion,
wherein the abutment presses against the abutting surface, the hook engages the hook protrusion, and the barb receiver interlocks with the barb to maintain the closed configuration.

14. The tube clamp for bioprocessing of claim 13, wherein the attachment region of the first clamp member includes an abutting surface and a barb receiver that is joined to a hook protrusion, and
wherein the attachment region of the second clamp member includes an abutment joined to a hook by a surface and a barb extends from the hook toward the abutment,
wherein the abutment presses against the abutting surface, the hook engages the hook protrusion, and the barb receiver interlocks with the barb to maintain the closed configuration.

15. A tube clamp for bioprocessing, comprising:
a first clamp member, comprising:
   a first end joined to a second end by a crescent shaped body; and
   a closure region joined to the first end;
a second clamp member comprising:
   a first end joined to a second end by a crescent shaped body; and
   a closure region joined to the first end;
wherein the closure region on the first clamp member includes a projection having a concave surface and the closure region on the second clamp member includes a projection and a bar cavity;
a first latch member including a body having a first end and a second end, the first latch member including a bar joined to the first end to engage the bar cavity, a projection opening to accept the projection on the second clamp member, and two protrusions extending outwardly from the body;
a second latch member including a body having a first end and a second end, the second latch member including two hooks surrounding two openings for engaging the protrusions on the first latch member, wherein actuating the first end of the second latch member causes the hooks to rotate about the protrusions.

* * * * *